Sept. 24, 1968 S. T. GIORDANO 3,403,346
HIGH ENERGY LINEAR ACCELERATOR APPARATUS
Filed Oct. 20, 1965 4 Sheets-Sheet 1

SYMMETRIC π MODE

SYMMETRIC π/2 MODE

INVENTOR.
BY SALVATORE T. GIORDANO

Sept. 24, 1968        S. T. GIORDANO        3,403,346
HIGH ENERGY LINEAR ACCELERATOR APPARATUS
Filed Oct. 20, 1965                                    4 Sheets-Sheet 2
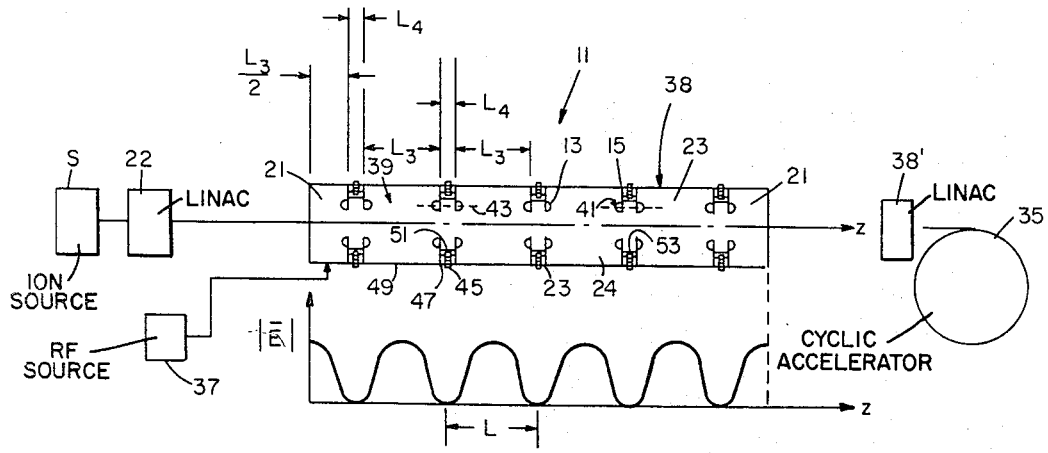
*Fig. 6*
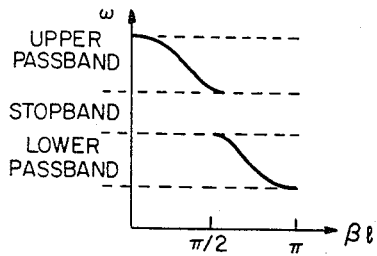    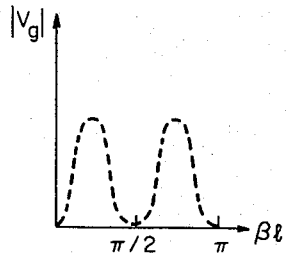    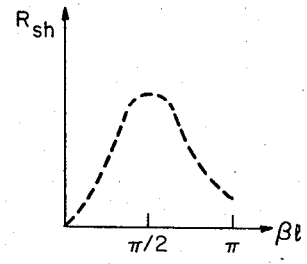
*Fig. 8*           *Fig. 10*          *Fig. 5*
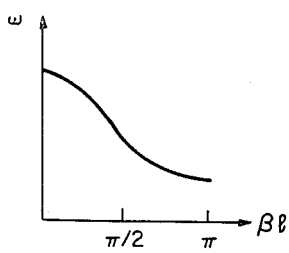    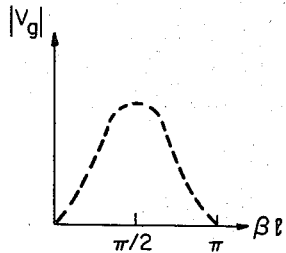    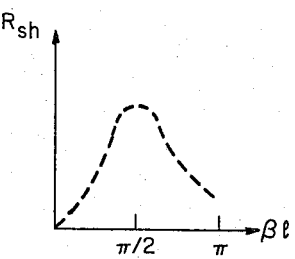
*Fig. 7*           *Fig. 9*          *Fig. 11*
INVENTOR.
SALVATORE T. GIORDANO
BY
*Roland A. Giordano*
ATTORNEY Sept. 24, 1968     S. T. GIORDANO     3,403,346
HIGH ENERGY LINEAR ACCELERATOR APPARATUS
Filed Oct. 20, 1965     4 Sheets-Sheet 4

INVENTOR.
BY    SALVATORE T. GIORDANO 3,403,346
HIGH ENERGY LINEAR ACCELERATOR APPARATUS
Salvatore T. Giordano, Port Jefferson, N.Y., assignor to the United States of America as represented by the United States Atomic Energy Commission
Filed Oct. 20, 1965, Ser. No. 499,120
9 Claims. (Cl. 328—233)

ABSTRACT OF THE DISCLOSURE

High energy linear accelerator apparatus for protons and heavier charged particles having a plurality of uniform diameter disk shaped irises forming periodic, alternate, long and short cells having uniform inside diameters and fixed and adjustable tuning means providing high shunt impedance at increasing particle velocities, high transit time factor, small mode separation around the operating mode, low sensitivity to tank de-tuning errors, simple control, and high energy injection into cyclic particle accelerators.

---

This invention relates to method and apparatus for accelerating charged particle beams and more particularly to method and apparatus for accelerating proton or heavier ion beams to high energies in a linear accelerator. The invention described herein was made in the course of, or under a contract with the U.S. Atomic Energy Commission.

In the field of physics, it is desirable to accelerate beams of protons or heavier particles in a linear accelerator, where the particles have a low momentum spread, small beam cross-section and divergence, high intensity and straight forward or conventional injection and extraction. In the acceleration of these protons, or heavier ions, the particles do not reach 99% of the velocity of light ($\beta = v/c = 0.99$) until the particles reach an energy in the multiple bev. range. One apparatus for accelerating protons is the linear accelerator for the AGS at the Brookhaven National Laboratory. As described in "The Linear Accelerator Injector for the AGS" by S. Giordano, reprinted in the 1960 International Convention Record, this linear accelerator, or linac, is a cylindrical, metal, standing wave, resonating cavity structure of the Alvarez type having attendant magnetic and electric fields. The magnetic field is azimuthally strong at the cylindrical wall and zero on the axis. The electric field is wholly longitudinal, being strongest on the axis and zero at the cylindrical wall with electric field lines that are parallel to the cavity axis on the cavity end wall. Such a resonant system is driven by an RF oscillator and amplifier coupled to the cavity. The system has a high quality factor Q ($Q = 2\pi$ energy stored/energy lost per cycle and a high shunt resistance, referred to hereinafter as shunt impedance. Shunt impedance is defined by the formula:

$$R = \frac{\epsilon_0^2}{\text{power dissipation per unit length}}$$

where $\epsilon_0^2$ is the average particle energy gain squared/unit length of the cavity structure.

Since the ions take many periods for the RF field to travel from one end of the cavity to the other, drift tubes are used to shield the ions from the field while the field direction is decelerative rather than accelerative. The tube length is cut so that the ions take exactly one full period to pass from the entrance of one tube to the entrance of the next tube, i.e. one full cell length. One cell is thus defined as a drift tube plus a gap or, equivalently, as half a tube, plus half the next tube. The length $L_n$ of each cell is defined by $L_n = \beta_n \lambda$ where $\lambda$ is the free space wave length of the radio frequency drive voltage.

While this and the other linear accelerators known heretofore have been useful and can accomplish the desired acceleration they have been limited to energies below about 150 mev. because their shunt impedance has gone down sharply at increasing particle energies. Above about 150 mev., for example, the shunt impedance is so low, i.e. below about 20 MΩ/m., that they have been impractical at higher particles energies. Thus, these accelerators have been used at low energies only and for injection into cyclic magnet type accelerators for acceleration to high energies. Moreover, these lines have limited the cyclic accelerator beam intensity to a low level corresponding to the space charge repulsion limit of the cyclic accelerator at the low maximum linac particle energies. It is additionally advantageous to provide a linac for accelerating protons to high energies with a high phase stability, low transit time factor, simple mechanical design, large mode separation around the operating mode, low sensitivity to tank de-tuning errors, and simple control means.

It has now been discovered that an iris loaded wave guide, operating as either a forward wave or backward wave standing wave resonator can be used to accelerate protons and heavier particles to high energies wherein the shunt impedance increases at increasing particle velocities $\beta$.

It is an object of this invention, therefore, to provide an economical and practical apparatus and method for accelerating protons and heavier ions to high energies by providing an alternating, periodic, iris-loaded, $\pi/2$ mode, standing wave accelerating system.

It is another object of this invention to provide means for injecting protons and heavy ions into a cyclic accelerator at high energies;

It is another object of this invention to provide means for providing a high energy beam of protons or heavier ions with high reliability and minimum cost;

It is another object of this invention to provide improved linear accelerator means;

It is another object of this invention to provide simple control means for a high energy linac;

It is another object of this invention to provide iris loaded full cells having spacer cells therebetween forming oppositely directed nose cones for accelerating charged particles to high energies;

It is another object of this invention to provide a standing wave accelerator for charged particles wherein the $\pi/2$ mode occurs at a given frequency or within a narrow band of frequencies;

It is another object of this invention to provide a cellular standing wave accelerator for charged particles having a continuous dispersion curve over a band of frequencies from a phase shift per cell of 0 to $\pi$;

It is a further object of this invention to provide for handling protons and other heavy charged particles from low energies to high energies;

It is a further object of this invention to provide a high energy, linear, heavy charged particle accelerator having phase stability, high transit time factor, high shunt impedance, simple mechanical design and low sensitivity to tank de-tuning errors;

It is a further object of this invention to provide for increasing shunt impedance in a high energy linac at increasing $\beta$;

It is a still further object of this invention to provide a linac having a large mode separation around its operating mode.

The foregoing objects are achieved by this invention in a simple, efficient and effective method and apparatus that linearly accelerates a proton beam from a conventional source, such as the linear accelerator at the Brookhaven National Laboratory for injecting protons into a 33 bev. Alternating Gradient Synchrotron. The method and construction involved in this invention utilize standard and well known techniques and apparatus and are highly flexible for a wide range of applications, beam energies, intensities and particles such as protons and other particles that are heavier than protons. In one embodiment, the acceleration of protons is accomplished in a system, comprising a conventional proton source, and a linear non-symmetrical, periodic, $\pi/2$ mode, backward wave accelerator cavity having alternate, periodic, iris-loaded, long cells, separated by alternate, periodic, short cells, with oppositely directed nose cones in the larger cell where the protons are accelerated up to 500 mev. or higher for injection into a cyclic accelerator for accelerating protons up to 33 bev. or higher. With the proper selection of cells, spacing, nose cones and perturbation tuning, control or adjustment, as described in more detail hereinafter, the desired high energy beams are obtained.

Various other objects, novel features and advantages will appear from the following description of one embodiment of this invention, and the novel features will be particularly pointed out hereinafter in connection with the appended claims.

In the drawings where like parts are marked alike:

FIGURE 1c is a graphic illustration of the group velocity (i.e. the derivative of the slope of the dispersion curve) of the structure of FIG. 1a;

FIGURE 5 is a graphic illustration of the shunt impedance vs. mode from 0 to $\pi$ of the alternating periodic structure of FIGURE 4.

FIGURE 6 is a partial cross-section of a structural embodiment of this invention incorporating the principles of FIGURE 4;

FIGURE 7 is a graphic illustration of the structure of FIG. 6 showing a continuous dispersion curve for an alternating periodic, $\pi/2$ structure with nose cones;

FIGURE 8 is a graphic illustration of the alternating periodic structure of FIGURE 4 (with alternate iris spacings) showing an original passband split into upper and lower passbands with a stopband between the two passbands;

FIGURE 9 is a graphic illustration of the group velocity of the alternating periodic $\pi/2$ structure of FIG. 4 with nose cones;

FIGURE 10 is a graphic illustration of the alternating periodic structure of FIGURE 4 showing the group velocity (without nose cones);

FIGURE 11 is a graphic illustration of the high shunt impedance of the alternating periodic $\pi/2$ structure of FIG. 6 with nose cones;

FIGURE 18 is the dispersion curve of the structure of FIG. 17a;

FIGURE 19 is an H iris for the structure of FIG. 17a;

FIGURE 20 is an R iris for producing the field configuration of FIG. 17a;

Figure 1A:
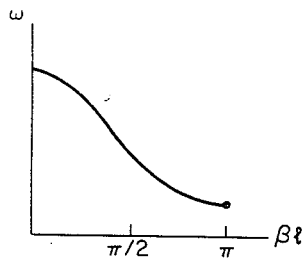
FIGURE 1a is a graphic illustration of a typical dispersion curve showing $w_1$ the relation of frequency as a function of phase velocity along the length of a waveguide, for various modes from 0 to $\pi$ in a symmetric, periodically loaded backward wave (standing wave) structure.
Figure 1B:
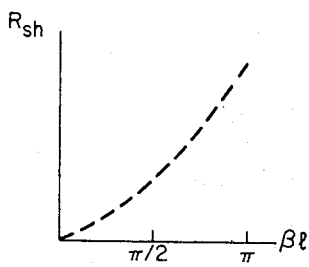
FIGURE 1b is a graphic illustration of the shunt impedance vs. mode of the structure of FIGURE 1a (for a constant $\beta$)
Figure 1C:
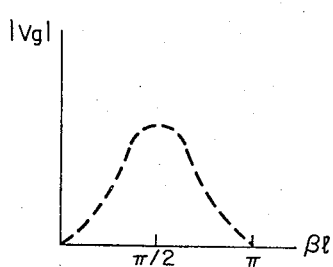

Symmetric, periodically loaded structures, such as clover leaf, slotted iris and iris-loaded waveguides, can be modified to operate in any mode between 0 and $\pi$. FIGURE 1a, for example, shows a typical dispersion curve wherein $\omega$ is the relation of the frequency as a function of phase velocity along the length of the waveguide for a backward wave structure from the 0 to $\pi$ modes. For a fixed $\beta$, FIGURES 1b and 1c show the variation of $R_{sh}$ (shunt impedance), and $\nu_g$ (group velocity=$d\omega/d\beta$, where $\omega$=angular frequency and $\beta=2\pi/\lambda g$, where $\lambda g$=guide length). We see from FIGURES 1b and 1c that the highest $R_{sh}$ occurs at the $\pi$ mode, where the group velocity is zero.

It was proposed to reduce beam loading and tank detuning effects by making the group velocity, i.e., $d\omega/d\beta$, as large as possible, which corresponds to working in the middle of a passband and which occurs at the $\pi/2$ mode where the shunt impedance is considerably lower than the $\pi$ mode, or making $d^2\omega/d\beta^2$ as large as possible, which corresponds to working at the edge of a passband (such as the $\pi$ mode) and making the band width as large as possible [B.W.=bandwidth=$2(\omega_o-\omega_\pi/\omega_o+\omega_\pi)$, where $\omega_o$=angular frequency of the $o$ mode, and $\omega_\pi$ is the angular frequency of the $\pi$ mode.]

With regard to the $\pi/2$ mode in the above mentioned structure, the $R_{sh}$ is low (compared e.g. to the $\pi$ mode) due to the difference of the variation of the axial electric field. This may be understood with reference to FIGS. 2 and 3, wherein are illustrated two linear accelerator structures A and A' having the same $\beta$, operating in the $\pi$ and $\pi/2$ mode respectively, showing the variation of $\bar{E}$ i.e. peak axial electric field, as a function of both $z$ and $t$. Various measurements have shown that this shunt impedance of the $\pi/2$ mode is between ⅓ and ½ of the shunt impedance of the $\pi$ mode for the symmetric periodically loaded structure having equal width cells C separated by irises I. Additionally, the transit time factor for the $\pi$ mode is larger (compared e.g. to the $\pi/2$ mode).

The latter may be understood by reference to a synchronous particle, whose shunt impedance is defined as $$R_{sh}=\frac{\left[\int_0^L \bar{E}dz\right]^2}{\int_0^L Pdz}$$

Figure 2:
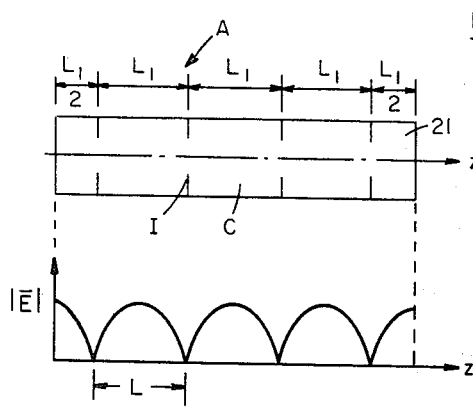
FIGURE 2 is a schematic representation of a symmetric, periodically loaded structure operating in the $\pi$ mode and showing the variation of $\bar{E}$ vs. $z$ where $\bar{E}$=peak electric field and $z$ is distance along the axis of the structure.
Figure 3:
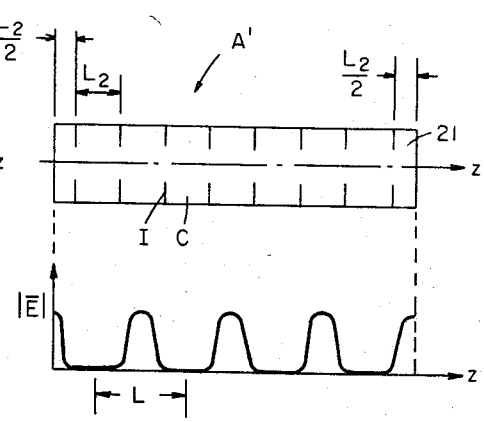
FIGURE 3 is a schematic representation of a symmetric, periodically loaded structure operating in the $\pi/2$ mode and showing $\bar{E}$ vs. $z$ (whereas FIG. 2 and FIG. 3 are for the same $\beta$)

(wherein the transit time factor but not the synchronous phase angle are included), where P is the power loss per unit length as a function of $z$, and where the limits of integration are taken from 0 to L, which represents a periodic length of the electric field variation as shown in FIGS. 2 and 3. In the last above equation for $R_{sh}$, if we write $\bar{E}=Ef(z,t)$, where E is simply a magnitude then $$R_{sh} = \frac{E^2 \left[\int_0^L f(z,t)dz\right]^2}{\int_0^L P\,dz}$$

Since $E^2$ is proportional to the stored energy, therefore, $$Q \alpha \frac{E^2}{\int_0^L P\,dz}$$

and $$R_{sh} \alpha KQ \left[\int_0^L f(z,t)dz\right]^2$$

Comparing some of the measured values of $R_{sh}$ and Q for the $\pi/2$ and $\pi$ mode in the above equation, we find that the value of $$\int_0^L f(z,t)dz$$

for the $\pi$ mode is larger than the same integral evaluated for the $\pi/2$ mode. The $$\int_0^L f(z,t)dz$$

can now be related to the transit time factor, to show that the transit time factor for the $\pi$ mode is high. It is additionally noted that the $\pi$ mode symmetric periodically loaded structure has the disadvantage of small mode separation around the operating mode. Also, the higher the group velocity, which is the velocity at which the rf energy propagates down the structure, the less the detuning and beam loading effects. In a conventional symmetrical periodic $\pi$ mode waveguide the group velocity approaches zero, which means that the propagation of RF energy down the wave guide takes a relatively long time.

Figure 4:
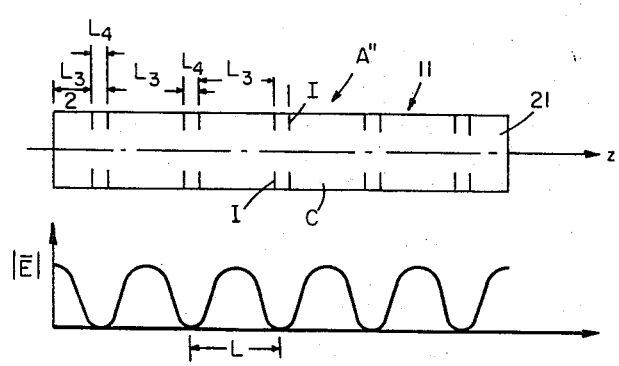
FIGURE 4 is a schematic illustration of a device incorporating the principles of the alternating, periodic, iris-loaded $\pi/2$ mode standing wave accelerating structure of this invention.
Figure 12:
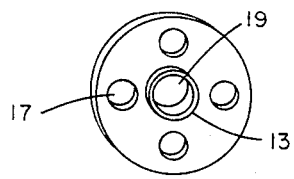
FIGURE 12 is a partial end view of a spacer cell iris of FIGURE 6.

Should the periodicity be alternated in a non-symmetrical multiple periodic A″ structure 11 as shown in FIG. 4, a high transit time factor and high shunt impedance are provided for the $\pi/2$ mode. This high shunt impedance is shown in FIG. 5. This structure is provided by moving the irises of FIG. 3 together to form small cells between large cells. In the $\pi/2$ mode this structure provides a reduction in the minimum electric field region so as to provide an electric field configuration that approaches the electric field configuration shown in FIG. 2. To this end the small cells have a small width. Moreover, by detuning alternate cells either by a perturbation tuner as described in more detail hereinafter, or by adding nose cones 13, as shown in FIG. 6, the upper and lower passbands can be made continuous as shown in FIG. 7. This nose cone structure is in contrast to the same structure without nose cones since in the latter case the passband is split into upper and lower passbands having a stopband therebetween, as shown in FIG. 8. Also, these nose cones provide a finite group velocity at the $\pi/2$ mode, as shown in FIG. 9, whereas without the nose cones the multiple periodic structure provides a group velocity that is zero at the $\pi/2$ mode, as shown in FIG. 10. Additionally, the multiple periodic nose cone structure results in a high shunt impedance as shown in FIG. 11.

A practical non-symmetrical, iris and nose cone arrangement for accomplishing the acceleration of protons above about 50 to 150 mev. is shown in FIG. 6. The iris 15 utilizes H-field coupling, resulting in a backward wave structure. To this end the irises 15 form four coupling holes, referred to hereinafter as holes 17, which are located in an equally spaced annular array having first and second pairs in perpendicular planes passing through the center of center hole 19. Typically the bore hole 19, which is centered on the axis of a 10-inch diameter iris 15, has a diameter of 2.125 inches and the coupling holes 17 have a diameter of 2.25 inches. This structure is advantageously incorporated in the multiple periodic cavity 11 of FIG. 6, wherein the boundary conditions (end cells 21) are one-half the length of the periodic full cells 23 thereof.

In operation linac 22, which accelerates particles to 50 or 150 mev., comprises a conventional Alvarez type linac having suitable drift tubes, quadrupole focusing magnets, resonating standing wave cavity and proton sources, such as is provided in the BNL linac for the 33 bev. AGS. This linac may be used as is, but for peak efficiency it is extended sufficiently by a simple scale up to produce a beam of 150 mev. protons that are injected into linac 11. In this linac 11 the spacer cells 23 are as short as possible to provide a large transit time factor and to this end are between ⅛ to ¼ of the length of the full cells 24. The full cells 24 are a minimum of about 2″ in the length and they increase in length as $\beta$ (the proton velocity) increases. The shunt impedance, which comprises accelerator losses and transit time factor, is optimized by nose cone variation, spacer and full cell length variation and perturbation tuning means, as described in more detail hereinafter, the latter conveniently being remotely insertable. The protons are accelerated up to from 500 to 1000 mev. or more in linac 11 and can be injected into a conventional strong focussing AGS cyclic accelerator 35 such as the Brookhaven AGS, for acceleration the protons to 33 bev. or more. This AGS is described in U.S. Patents 2,882,396 and 3,089,092. Since the linac 11 of this invention injects the protons into the cyclic accelerator 35 at the space charge repulsion limit of the cyclic accelerator 35 at high injection energy (e.g. 500 mev.), the output intensity of the cyclic accelerator beam is greatly increased over conventional methods and apparatus.

A 200 megacycle pulsed radio frequency power source 37 is used to excite the linac 11 and there is an RF field phase change by $\pi$ between each large spacer cell and the next succeeding large spacer cell. Suitable busses carry this power to the initial section 38 and later sections 38′ of linac 11. The radio frequency system for linac 11 is like that for the linac 22. One suitable system is described in the referenced Giordano publication. The vacuum system V for both linacs 11 and 22 is conventional. One suitable system is described in the referenced Giordano publication.

Figure 13:
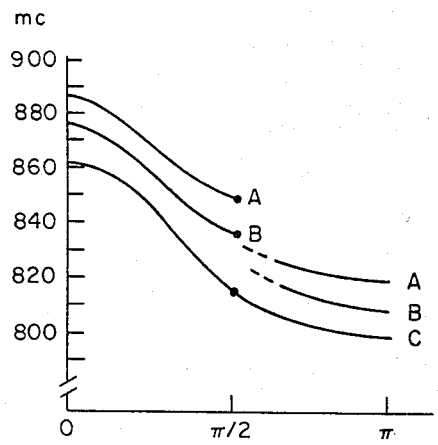
FIGURE 13 is a graphic illustration of the dispersion curves for nose cone variation in the structure of FIGURE 6.

The accelerator cavity 39 of linac 11 is originally tuned by providing the correct length of the nose cones 13. Thus, for example, in a cavity 39 having 2″ full cell lengths and ¾″ spacer cell lengths, where the frequency in mc. is plotted against phase shift/cell from 0 to $\pi$, the frequency of the dispersion curves decreases with increasing nose cone length, as shown in FIG. 13, where curve A represents the plot without nose cones 13, curve B is the plot for ⅛″ nose cones 13 and curve C is the plot of ¼″ nose cones 13. However, this adjustment results in a discontinuous dispersion curve above a certain nose cone length for a given cell. Thus, for the cell described, a ¼″ nose cone length will give a continuous dispersion curve C whereas a ⅛″ nose cone length and no nose cone give discontinuous dispersion curves as shown in FIG. 13. Advantageously, the nose cones 13 of FIG. 6 have an elliptical shape with the length thereof measured from the vertex 41 of the nose cone ellipse along the ellipse axis 43.

Figure 14:
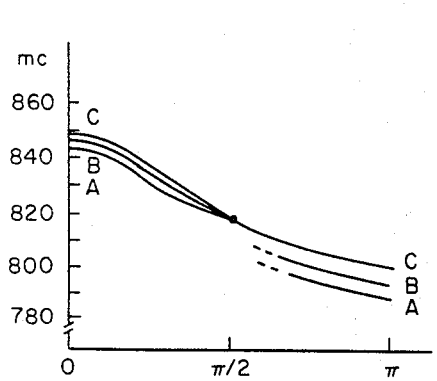
FIGURE 14 is a graphic illustration of the dispersion curve for various perturbation tunings in the spacer cells of the FIGURE 6 structure.

Additional tuning is accomplished by perturbations in the spacer cells 23. To this end threaded, remotely actuated, copper rods 45 pass through holes 47 in the side 49 of the cavity 39, as shown in FIG. 6, wherein the frequency is plotted against phase shift/cell. Here the perturbations increase or decrease by enlarging or decreasing respectively the diameter of end 51 or rods 45. Suitable means for changing the size of ends 51, comprises sleeves or rods of decreasing diameter or threaded rods 45 having decreasing diameter copper caps 53 on ends 51. As shown in FIG. 14, with a ½″ nose cone, 4″ full cell length ½″ spacer cell and no perturbation in the spacer cell, the perturbation curve A had low frequency, with small (uncapped) rods 45 the frequency of the dispersion curve B was raised and with large (or capped) rods 45 the frequency of the dispersion curve C was still higher. It is also noted that curves A and B were discontinuous and curve C was continuous. However, the resonant frequency of the $\pi/2$ mode did not change, which meant that for the $\pi/2$ mode there was no stored energy in the small (spacer) cell and the frequency of all other modes, except the $\pi/2$, where affected by these tuners whereby it was posible to change the shape of the dispersion curve without affecting the frequency of the $\pi/2$ mode.

Figure 15:
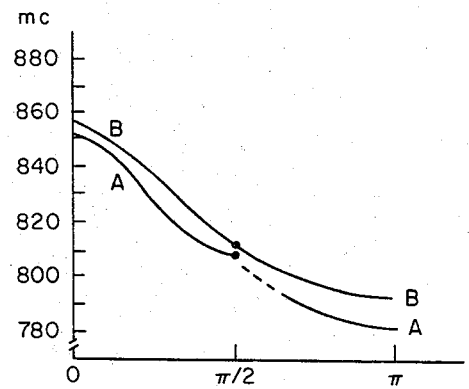
FIGURE 15 is a graphic illustration of the dispersion curves for various spacer cell widths in the structure of FIG. 6.

The spacer cell 23 is also varied to produce a continuous dispersion curve as shown in FIG. 15. This is a plot of frequency vs. phase shift/cell from 0 to $\pi$ in a resonating cavity 39 having a 2″ full cell length and ¼″ nose cones 13. In this end the above mentioned tests plotted in FIGS. 13 and 14, the center hole 19 had a diameter of 2⅛″, the coupling holes 17 had a diameter of 2¼″ and the iris 15 was .03″ sheet copper. As shown in FIG. 15, increasing the spacer cell length increased the frequency of the dispersion curve. Also, the dispersion curve was continuous with a ½″ spacer cell length and discontinuous with a ¼″ spacer cell length. It is additionally noted from the above curves that the structure of this invention provides high mode separation around the $\pi/2$ operating mode.

In actual experimental measurements made with demountable, multiple, periodic, cavities 39 of this invention, using sheet metal irises 15 and H-field coupling holes 17 in a backward wave $\pi/2$ mode structure 11, the shunt impedance was increased at increasing particle velocities by changing the accelerator 11. This can be seen from actual changes in dimensions as follows:

TABLE I

| $\beta$ | Spacer cell length (in.) | Large cell length (in.) | Nose cone length (in.) | $R_{sh}$ (m.Ω/m.) |
|---|---|---|---|---|
| .5 | .5 | 3 | .25 | 16 |
| .6 | .25 | 4 | .375 | 22 |
| .8 | 1.5 | 4 | .25 | 28 |

In each of these models the bore hole 19 was 2.125″ in diameter, the resonant frequency of the $\pi/2$ mode was approx. 800 mc./sec., the iris thickness was .03″, the inside diameter of the cavity 39 was 10 inches and the coupling holes were 2¼″ in diameter. It was found these shunt impedance values are much higher than those of symmetrical cloverleaf, slotted iris and iris-loaded structures operating in the $\pi/2$ mode. It was also found that the multiple (non-symmetrical) alternating cell structures of this invention were at least ten times less sensitive to tank detuning errors than conventional $\pi$ mode structures.

The parameters for a 150 to 500 mev. linac 11 are:

Single cavity tank length _____meters__ 30
Total number of (cavity) tanks for 500 mev. ____ 5
Amplifier driving ports per (cavity) tank _____ 10
R.F. frequency _____mc__ 800
I.D. of cavity 39 _____inches__ 10
Iris thickness _____do____ 0.5
Iris spacing (center to center) inches for big cells _____ 2–5
Q of cavity 39 _____ 18,000–40,000
Duration of acceleration _____μsec__ 200
Shunt impedance _____mcg. Ω/meter__ 20–40

Figure 16:
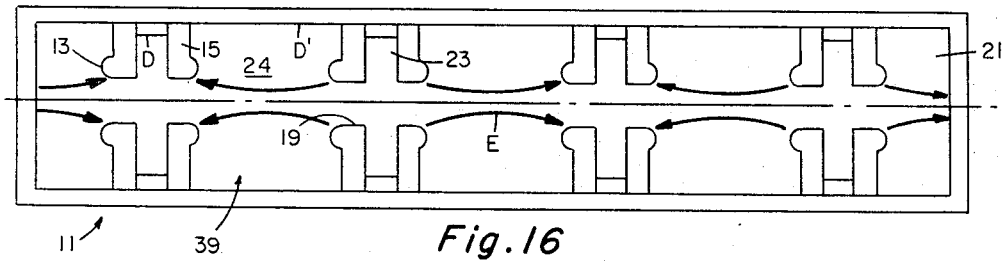
FIGURE 16 is the field configuration with another embodiment of the structure of FIG. 6.

In another embodiment shown in FIG. 16, tuning is accomplished by decreasing the inside diameter D of the spacer cells 23 relative to the inside diameter D′ of the full cells 24. To this end the resonating cavity 39 may be made in separate sections having multiple periodic, small diameter spacer cells 23 that are insertable between multiple periodic full cells 24 and held therein in an assembly by suitable clamping means (not shown). The arrows E represent the electric field lines.

While it is understood that linacs 11 and 22 are advantageously pulsed because of their high power requirements, they could be run continuously by sufficient power. Likewise, it is understood that the protons are bunched in linac 22 and remain bunched in linac 11.

In another embodiment, a long full cell is followed by two short cells and is operated in the $2\pi/3$ mode.

Figure 17B:
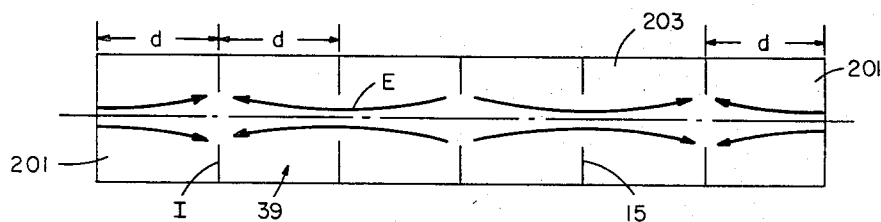
FIGURE 17b shows the electric field of the structure of FIG. 7a with H irises.
Figure 17A:
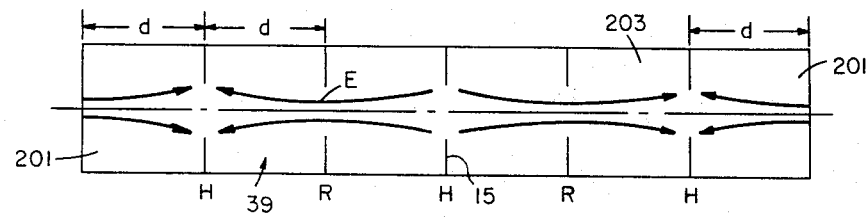
FIGURE 17a is a schematic illustration of the arrangement of the field configuration for another structure that can be operated in the $\pi/2$ mode.
Figure 19:
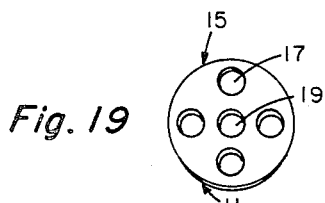
Figure 20:
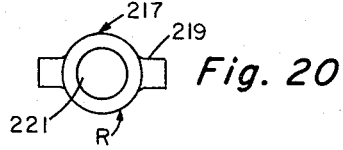
Figure 18:
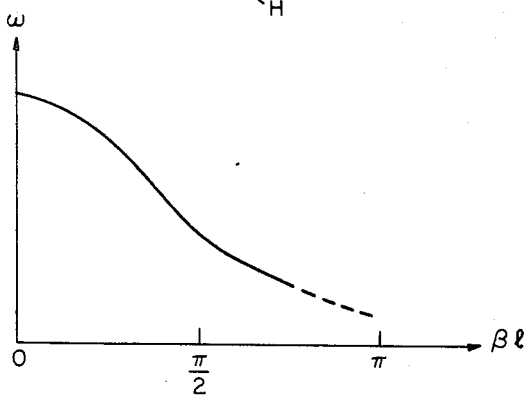

It is also understood that the $\pi/2$ mode can be used in other field configurations as shown in FIG. 17a. Here the end cells 201 are the same length as the full cells 203, there are four or more even number of irises 15 and therebetween there may be two or more even number short drift tubes 207 supported by stems. With suitable electric field loading on the irises and drift tubes, the dispersion curve or FIG. 18 is obtained and in this regard it is noted that the $\pi$ mode is missing. H-form irises 15 are used having four coupling holes 17 and a center bore hole 19 as shown in FIG. 19. An R iris 217, consisting of a bar 219 and bore hole ring 221 may also be used as shown in FIG. 20. These R forms irises 217 are arranged, as shown in FIG. 17 to alternate with the H irises 15. This iris loaded particle accelerator is a $\pi/2$ structure, comprising an end terminated waveguide cavity having N irises in spaced apart relationship sub-dividing the cavity into N+1 equal cells, where N is an odd positive integer. The electric field configuration of this structure with all H irises is shown in FIG. 17b.

The accelerator system of this invention has the advantage of providing high proton (and heavier ion) energies (e.g. up to 500 bev. or more) with or without injection into a high energy (33 bev. or more) cyclic accelerator of the AGS type. Moreover, the system of this invention is practical, efficient, dependable and is simple in mechanical design and operation. This invention additionally provides a standing or backward wave, multiple periodic, $\pi/2$ mode, easily tunable, resonating accelerator cavity having high shunt impedance that increases at increasing $\beta$, a high transit time factor, small mode separation around the operating mode, low sensitivity to tank de-tuning errors and simple control means.

What is claimed is:

1. High energy, linear accelerator, apparatus (11) for use with a source (22) of highly energized charged particles, comprising an iris-loaded, cylindrical waveguide (38) forming a waveguide cavity (39) having circular, uniform diameter irises (15) subdividing the waveguide cavity into long, alternating, multiple periodic, first cells (24) separated by short, alternating, periodic, spacer cells (23) connected through uniform diameter openings (19) in the irises (15) for the passage of said particles therethrough along the axis (z) of said cylindrical waveguide cavity for accelerating said particles therein to high energies.

2. The invention of claim 1 having adjustable tuning means, comprising copper rods (45) that are adjustably insertable radially into said spacer cells (23), and fixed tuning means, comprising annular, ring shaped nose cones (13) attached to adjacent of said irises (15) and oppositely extending into said long cells (24) around the openings (19) in said irises (15).

3. The invention of claim 1 in which said spacer cells (23) have fixed tuning means, comprising annular ring-shaped nose cones (13) that tune said cavity (39) of said waveguide (38) to the desired frequency, said nose cones being connected respectively to an iris (15) to form an annulus disposed around the opening (19) in a respective iris along the axis (z) of said waveguide cavity, being elliptical in cross-section, and being directed oppositely from a wide cross-section adjacent said spacer cells (23) toward a vertex in the long cells (24) with a length that determines the tuning thereof.

4. The invention of claim 1 in which said spacer cells (23) have adjustable perturbation tuning means, comprising copper rods (45) forming ends (51) insertable radially through the outside of said waveguide (38) toward the axis (z) of said waveguide cavity (39) and sleeves (53) of decreasing diameter threaded on said insertable ends (51) of said rods (45).

5. The invention of claim 1 in which said waveguide (38) has a radio-frequency power source (37) for producing an RF field whose phase changes by $\pi$ between each long cell (24) with a shunt impedance that increases at increasing proton velocities whereby protons can be received from said source (22) and accelerated efficiently in stages in a plurality of said waveguides (38 and 38') from 150 mev. up to 500 mev. for injection into a cyclic proton accelerator (35) at the space charge repulsion limit of said cyclic accelerator.

6. The invention of claim 1 in which said waveguide cavity (39) terminates in end cells (21) half the length of the adjacent long cells (24) and having spacer cells (23) ⅛ to ¼ the length of said long cells (24) for preventing stored energy in said spacer cells (23) for providing high shunt impedance in said linear accelerator apparatus (11).

7. The invention of claim 1 in which said irises (15) form four coupling holes (17) that are equally spaced in an annular array around said opening (19) in said irises (15) along said axis (z) of said cavity (39) in said waveguide (38) to provide an H-field coupling for backward wave operation of said linear accelerator apparatus (11).

8. The linear accelerator apparatus of claim 1 having a plurality of said waveguides forming stages (38 and 38') in which the openings (19) have a uniform diameter in irises (15) of uniform thickness having a spacing of from 2–5 inches therebetween in said long cells (24) in a cavity (39) having a uniform inside diameter, and having fixed tuning means (13) on said irises (15) around said openings (19) and adjustable tuning means (45) in said spacer cells (23) for accelerating protons in said linear accelerator apparatus (11) in the $\pi/2$ mode with a shunt impedance of from 20 meg. $\Omega$/meter to 40 meg. $\Omega$/meter.

9. The invention of claim 1 having tuning means therein arranged in uniform diameter long cells (24) and uniform diameter short cells (23) to provide a finite group velocity and a high shunt impedance when said linear accelerator apparatus (11) is operated in the $\pi/2$ mode.

References Cited
UNITED STATES PATENTS 3,070,726   12/1962   Mallory _____ 315—5.42

ELI LIEBERMAN, *Primary Examiner.*

S. CHATMON, Jr., *Assistant Examiner.*